3,042,634
POLYMERIZATION OF MONOOLEFINS IN THE PRESENCE OF COMMINUTED VULCANIZED RUBBER

Ivan Mankowich, Cheshire, Conn., Frank P. Chiavetta, Covina, Calif., and Raymond A. Chartier, Painesville, Ohio, assignors to United States Rubber Company, New York, N.Y., a corporation of New Jersey
No Drawing. Filed June 20, 1958, Ser. No. 743,490
4 Claims. (Cl. 260—4)

The present invention relates to the treatment with certain monoolefinic resin-forming monomers of rubber that has been vulcanized.

The blending of rubbers and resins by physical mixing of the solid materials to give so-called gum plastics is known. Homogeneous mixing may be accomplished when the rubber portion has not been vulcanized, but difficulty is encountered in obtaining a uniform intimate mixture or smooth blend when the rubber portion has been vulcanized, whether it still be in cured condition as in the forms of scrap vulcanized rubber, or has been reclaimed as by heating the vulcanizate with reclaiming aids, such as softening oils, to accomplish so-called devulcanization or reclaiming.

We have found that certain monoolefinics, viz. styrene, alpha-methyl styrene, acrylonitrile and mixtures thereof may be polymerized at high temperatures in an aqueous medium containing comminuted rubber that has been vulcanized to give a product that may be readily masticated to give a uniform smooth rubber-resin blend, and that may be further mixed with rubbers and/or resins to give uniform smooth products.

In carrying out the invention, the rubber that has been vulcanized and is in a comminuted condition is mixed with water and styrene, alpha-methyl styrene, acrylonitrile or mixtures thereof as the resin-forming monomers, and the resin-forming monomers are polymerized in the presence of the rubber by heating under pressure in a closed container to 125° C. to 250° C. In the case of tire scrap, the vulcanized rubber is preferably ground to pass through a screen having 5/8 inch diameter round holes or a screen having 1/4 inch square openings. The time of heating may be from 1/2 to 48 hours to give the desired degree of conversion of resin-forming monomers to polymeric resin. Generally, the time and temperature of heating will be from one-half to twenty hours at 150° C. to 225° C. The amount of water should be at least one part per part of the rubber. The upper range of water to rubber ratio is not critical and depends on the economics of having to heat the added water and the solubility of the monomer in the added water. Generally, 25 parts of water per part of the rubber will be the maximum ratio used. The ratio of monoolefinic resin-forming monomers to rubber that has been vulcanized is at least 1:3 to give appreciable stiffening to the rubber and may be as high as 3:1 for very hard products. The ratio of the polymerization product of such monoolefinic resin-forming monomers to rubber in the final product will be in the range from 1:3 to 3:1. Peroxide catalysts, such as potassium persulfate, benzoyl peroxide, cumene hydroperoxide may be included, but they are not necessary. Likewise, emulsifying agents may be added, but they are not necessary. If desired, minor proportions, of diolefines, such as butadiene and divinyl benzene, e.g. up to one-fourth the weight of the monoolefines, may be added to copolymerize with the resin-forming monoolefines, styrene, alpha-methyl styrene and acrylonitrile. It is believed at least some of the monoolefinic resin-forming monomers are graft polymerized on the rubber. The polymerization of the resin-forming monomers in admixture with the water and comminuted vulcanized rubber may be accompanied by devulcanization or reclaiming of the vulcanized rubber. The reaction may take place in a conventional reclaiming "digester" (closed steam jacketed autoclave equipped with an agitator for reclaiming rubber), and there may be included in the mixture in the "digester" conventional reclaiming aids, such as pine tar plasticizer and reclaiming or softening oils, e.g. rosin oil and pine oil fraction, chemical reclaiming agents, e.g. alkyl amines, phenyl hydrazines, dicresyl disulfide, and fiber-destroying agents, e.g. caustic soda, zinc chloride.

The rubber which has been vulcanized and which may be used in the present invention may be natural rubber, or synthetic rubber, or mixtures of natural and synthetic rubber, or mixtures of different synthetic rubbers. The synthetic rubber may be the product of the emulsion polymerization in the presence of a free radical catalyst of the peroxide or azo type of one or more butadienes-1,3, for example, butadiene-1,3, 2-methyl-butadiene-1,3 (isoprene), 2-chloro-butadiene-1,3 (chloroprene), 2,3-dimethyl-butadience-1,3, piperylene, or a mixture of one or more such butadienes-1,3 with one or more other polymerizable compounds which are capable of forming rubber copolymers with butadienes-1,3, for example, up to 70% by weight of such mixture of one or more compounds which contains a $CH_2=C<$ group where at least one of the disconnected valences is attached to an electronegative group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene and vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridine; methyl vinyl ether; methyl vinyl ketone; vinylidene chloride. Common commercial synthetic rubbers of this type are GR-S (copolymer of a major proportion of butadiene and a minor proportion of styrene), Paracril (copolymer of a major proportion of butadiene and a minor proportion of acrylonitrile), and neoprene (polymerized chloro-2-butadiene-1,3). The synthetic rubber may also be the product of the polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is Butyl rubber which is a copolymer of about 96 to 99.5 parts of isobutylene and correspondingly 4 to 0.5 part of isoprene.

The following examples illustrate the invention. All parts and percentages referred to herein are by weight.

EXAMPLE 1

In this case, a whole tire reclaim was used. Analysis gave acetone extract 19.4%, ash 6.4%, carbon black 22.7%, natural rubber (direct) 28.3%, natural rubber and GR-S (difference) 46.1%.

Samples of the comminuted whole tire reclaim in admixture with styrene and water, with and without benzoyl peroxide, were heated for one hour at various temperatures, according to the receipes in the table below. Unreacted styrene monomer was determined on vacuum stripping to show the extent of resin formation. The products were sheeted out on a conventional laboratory mill, and the nature of the products is shown in the table.

*Table*

|  | Parts by weight | | | | | |
|---|---|---|---|---|---|---|
| Reclaim | 10 | 10 | 10 | 10 | 10 | 10 |
| Styrene | 10 | 10 | 10 | 10 | 10 | 10 |
| Water | 20 | 20 | 20 | 20 | 20 | 20 |
| Benzoyl Peroxide | | 0.1 | | 0.1 | | 0.1 |
| Temperature (°C.) | 100 | 100 | 150 | 150 | 200 | 200 |
| Unreacted Styrene percent | 91.0 | 97.8 | 5.1 | 7.7 | 1.3 | 1.0 |
| Nature of Product | Rubbery | Rubbery | Stiff Flexible Sheet | Stiff Flexible Sheet | Stiff Boardy Sheet | Stiff Boardy Sheet |

The above table shows the necessity for temperatures above 100° C. for effective polymerization of the resin-forming monomer. Also the relative degree of stiffness can be controlled by variation in the ratio of consumed resin-forming monomer to rubber, the higher the consumed monomer content the more nearly resin-like in properties and the lower the consumed monomer content the more nearly rubbery products are obtained. Also, peroxide catalysts are relatively unimportant.

EXAMPLE 2

In this case, fibre-free whole tire scrap vulcanizate was used. Analysis gave acetone extract 11.3%, ash 6.0%, carbon black 28.7%, natural rubber (direct) 25.5%, natural rubber and GR–S (difference) 51.1%.

Ten parts of the vulcanized scrap, ground to pass a six-mesh screen, in admixture with 10 parts of styrene and 20 parts of water were heated at about 200° C. for five hours. The styrene was completely polymerized. The sheeted product was a stiff, boardy sheet.

EXAMPLE 3

In this case, vulcanized cut thread made from natural rubber was used. Analysis gave 7.6% acetone extract, 18.17% ash, 71.3% natural rubber.

Samples of 10 parts of the vulcanized scrap thread in admixture with 16.3 parts of styrene and 20 parts of water were heated at about 200° C. for 2 hours and 3 hours. The styrene monomer was completely consumed. The product was a stiff, boardy composition.

EXAMPLE 4

In this case, neoprene reclaim was used. Analysis gave 17.0% acetone extract, 18.0% ash, 18.09% carbon black, 40.0% neoprene.

Ten parts of comminuted neoprene reclaim mixed with 10 parts of styrene and 40 parts of water were heated at about 200° C. for five hours. About 80% of the styrene was polymerized. A mill sheeted sample was a semi-rigid brittle product.

EXAMPLE 5

17.5 parts of the whole tire vulcanizate used in Example 2, ground to pass an eight-mesh screen were mixed with 12.5 parts of styrene, 50 parts of water, 0.0125 part of potassium persulfate, 0.0625 part of $NaH_2P_2O_7$, and 2 parts of lauryl sodium sulfate emulsifier in a typical emulsion polymerization recipe, and heated at about 200° C. for 5 hours. 98% of the styrene was converted to polymer to give a stiff sheet on milling compared to rubber.

EXAMPLE 6

Samples of 14 parts of comminuted whole tire vulcanizate used in Example 2 were mixed with 5 parts of styrene, 1 part of butadiene and 40 parts of water. Further additions were made of 0.003 part of divinyl benzene in one recipe, of 0.03 part of benzoyl peroxide in a third recipe. One recipe had no added divinyl benzene or benzoyl peroxide. The samples were heated to about 200° C. for five hours, giving essentially 100% consumption of monomers.

Acetone extraction data indicated the products to be 25 to 30% acetone soluble irrespective of the presence of divinyl benzene cross-linking agent and/or benzoyl peroxide catalyst.

Milled sheets indicated considerable stiffening to have been imparted by the resin portion.

EXAMPLE 7

Samples of 14 parts of comminuted whole tire vulcanizate used in Example 2 were mixed with 4.56 parts of styrene and 1.44 parts of acrylonitrile and 40 parts of water. Further additions were made of 0.003 part of divinyl benzene in one recipe, of 0.03 part of benzoyl peroxide in another recipe, and of both 0.003 part of divinyl benzene and benzoyl peroxide in a third recipe. One recipe had no added divinyl benzene or benzoyl peroxide. The samples were heated to about 200° C. for 5 hours. About 100% of the styrene and 85% or more of the acrylonitrile was consumed.

Acetone extraction data indicated the products to be 35 to 50% acetone soluble irrespective of the presence of divinyl benzene cross-linking agent and/or benzoyl peroxide catalyst.

EXAMPLE 8

In this case, vulcanized butyl tube scrap was used. Analysis gave acetone extract 7.5%, ash 4.8%, carbon black 31.0% and butyl rubber 53.8%.

100 parts of ground butyl tube scrap mixed with 4 parts of processing oil, 200 parts of water and 20 parts of acrylonitrile were heated at about 200° C. for 5 hours. A blank consisting of 20 parts of acrylonitrile and 200 parts of water was also heated at about 200° C. for 5 hours.

A brown, granular, solid polymer resulted from the treatment in the case of the blank and nitrogen analysis indicated approximately 10% conversion of monomer. The run containing the butyl rubber scrap was found to have been modified so that it contained polymerized monomer indicative of approximately 11% consumption of monomer charged.

EXAMPLE 9

The whole tire vulcanizate used in Example 2, ground to pass an eight-mesh screen was used in this example.

Ten parts of the ground whole tire vulcanizate were mixed with 10 parts of alpha-methyl styrene and 40 parts of water.

Another 10 parts of the ground whole tire vulcanizate were also mixed with 7.5 parts of styrene, 2.5 parts of alpha-methyl styrene and 40 parts of water.

The above mixtures were heated at about 200° C. for five hours.

In the first polymerization, about 7.2 parts of alpha-methyl styrene was recovered from the reaction mixture leaving a stiffened rubbery product, showing about 25 to 30% conversion of alpha-methyl styrene.

In the second polymerization, approximately 20 parts of a hard, grainy rubber-reaction product was obtained, indicating approximately complete conversion of monomers.

EXAMPLE 10

Portions of vulcanized cut rubber thread made from natural rubber were mixed in a seven and one-half gallon, agitated, jacketed "digester" with various amounts of styrene and of water as shown in the table below. The reactions were run for 3 hours employing about 200 lbs. per sq. in. gauge pressure steam in the jacket (about 200° C. temperature), after which the reaction products were blown from the digester, using internal pressure, washed and dried. Yields are also shown in the table.

Table

|  | Parts by Weight | | | | |
|---|---|---|---|---|---|
| Vulcanized Rubber | 100.0 | 100 | 100 | 100 | 100 |
| Styrene | 42.8 | 100 | 122 | 150 | 233 |
| Water | 35.7 | 1,000 | 800 | 800 | 1,800 |
| Yield (percent of Theoretical) | 90 | 91 | 93.8 | 94.5 | 97 |

The nature of these reaction products was such that they ranged from a stiffened rubbery product at the lower styrene monomer charge to a rigid brittle gum plastic at the high styrene monomer charge.

EXAMPLE 11

A mixed whole tire scrap (natural rubber and GR–S rubber) containing approximately 20% cellulose fiber was used in the following runs.

100 parts of the comminuted mixed whole tire scrap, 2 parts of fiber destroying agent (calcium chloride), 26.1 parts of styrene, 8.2 parts of acrylonitrile and 200 parts of water were treated for 5 hours in a 7½ gallon jacketed, agitated autoclave employing 200 lbs. per sq. in. gauge pressure steam in the jacket. The contents were blown into a receiving vessel, then washed and dried. Nitrogen analysis of the product indicated approximately 44% acrylonitrile of that charged in the reaction product with an overall yield of approximately 90% of theoretical. The reclaimed rubber was substantially stiffened.

A similar run was made with 100 parts of the comminuted mixed whole tire scrap, 2 parts of fiber destroying agent (calcium chloride), 7.5 parts of a terpene hydrocarbon softening oil (Solvenol), 10 parts of styrene, 10 parts of acrylonitrile and 200 parts of water. Approximately 30% of the charged acrylonitrile was polymerized with an overall yield of approximately 90% of theoretical.

A similar run was made with 100 parts of the comminuted mixed whole tire scrap, 2 parts of fiber destroying agent (calcium chloride), 1 part of chemical reclaiming agent (di-cresyl disulfide), 60 parts of styrene, 20 parts of alpha-methyl styrene and 200 parts of water. Overall yield of approximately 90% was obtained indicating substantial consumption of monomer. The reclaimed rubber portion was substantially stiffened.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The process of making a rubber-resin product which comprises heating a mixture comprising comminuted rubber that has been vulcanized, water and resin-forming monomeric material selected from the group consisting of the monoolefines styrene, alpha-methyl styrene, and acrylonitrile, and mixtures of such monoolefines with material selected from the group consisting of butadiene and divinyl benzene in amount up to one-fourth the weight of said monoolefines, at a temperature from 125° C. to 250° C. until polymerization of said monomeric material, and recovering a dry rubber-resin product therefrom that may be masticated to a uniform smooth blend, the ratio of said monomeric material to said rubber being in the range of 1:3 to 3:1, the amount of water being from 1 to 25 parts per part of rubber, and said rubber being selected from the group consisting of natural rubber and synthetic rubber polymers of material selected from the group consisting of butadienes-1,3 and mixtures of butadienes-1,3 with up to 70% by weight of such mixtures of compounds which contain a $CH_2=C<$ group and are copolymerizable with butadienes-1,3, and synthetic rubber copolymers of about 96 to 99.5 parts of isobutylene and correspondingly 4 to 0.5 part of isoprene.

2. The process of making a rubber-resin product which comprises heating a mixture comprising comminuted rubber that has been vulcanized, water and polymerizable monomer consisting of styrene at a temperature from 125° C. to 250° C. until polymerization of the styrene, and recovering a dry rubber-resin product therefrom that may be masticated to a uniform smooth blend, the ratio of said styrene to said rubber being in the range of 1:3 to 3:1, the amount of water being from 1 to 25 parts per part of said rubber, and said rubber being selected from the group consisting of natural rubber and synthetic rubber polymers of material selected from the group consisting of butadienes-1,3 and mixtures of butadienes-1,3 with up to 70% by weight of such mixtures of compounds which contain a $CH_2=C<$ group and are copolymerizable with butadienes-1,3, and synthetic rubber copolymers of about 96 to 99.5 parts of isobutylene and correspondingly 4 to 0.5 part of isoprene.

3. The process of making a rubber-resin product which comprises heating a mixture comprising comminuted rubber that has been vulcanized, water and resin-forming monomeric material selected from the group consisting of the monoolefines styrene, alpha-methyl styrene, and acrylonitrile, and mixtures of such monoolefines with material selected from the group consisting of butadiene and divinyl benzene in amount up to one-fourth the weight of said monoolefines, at a temperature from 125° C. to 250° C. from one-half to twenty hours, and recovering a dry rubber-resin product therefrom that may be masticated to a uniform smooth blend, the ratio of said monomeric material to said rubber being in the range of 1:3 to 3:1, the amount of water being from 1 to 25 parts per part of rubber, and said rubber being selected from the group consisting of natural rubber and synthetic rubber polymers of material selected from the group consisting of butadienes-1,3 and mixtures of butadienes-1,3 with up to 70% by weight of such mixtures of compounds which contain a $CH_2=C<$ group and are copolymerizable with butadienes-1,3, and synthetic rubber copolymers of about 96 to 99.5 parts of isobutylene and correspondingly 4 to 0.5 part of isoprene.

4. The process of making a rubber-resin product which comprises heating a mixture comprising comminuted rubber that has been vulcanized, water and polymerizable monomer consisting of styrene at a temperature from 125° C. to 250° C. from one-half to twenty hours, and recovering a dry rubber-resin product therefrom that may be masticated to a uniform smooth blend, the ratio of said styrene to said rubber being in the range of 1:3 to 3:1, the amount of water being from 1 to 25 parts per part of said rubber, and said rubber being selected from the group consisting of natural rubber and synthetic rubber polymers of material selected from the group consisting of butadienes-1,3 and mixtures of butadienes-1,3 with up to 70% by weight of such mixtures of compounds which contain a $CH_2=C<$ group and are copolymerizable with butadienes-1,3, and synthetic rubber copolymers of about 96 to 99.5 parts of isobutylene and correspondingly 4 to 0.5 part of isoprene.

References Cited in the file of this patent

UNITED STATES PATENTS

| 2,249,458 | Croasdale | July 15, 1941 |
| 2,512,697 | Te Grotenhuis | June 27, 1950 |
| 2,780,605 | Bevilacqua | Feb. 5, 1957 |

FOREIGN PATENTS

| 788,651 | Great Britain | Jan. 8, 1958 |